June 12, 1923.
G. N. BLANCHARD ET AL
1,458,680
HYDROCARBON GENERATOR AND BURNER
Filed Oct. 19, 1920
2 Sheets-Sheet 1
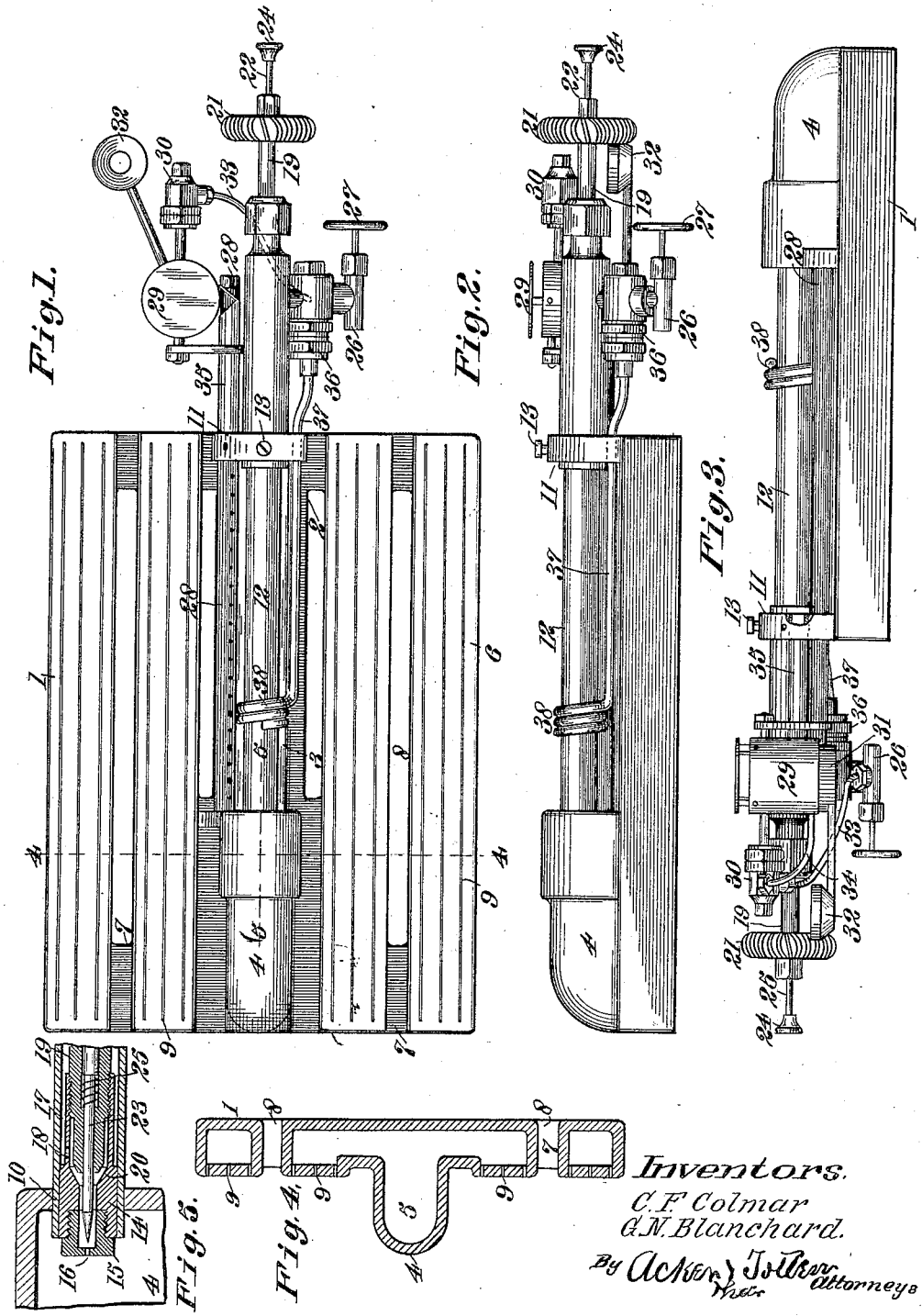
Inventors.
C. F. Colmar
G. N. Blanchard.
By Acker & Toller
Attorneys Patented June 12, 1923.

1,458,680

UNITED STATES PATENT OFFICE.

GEORGE N. BLANCHARD AND CLARENCE F. COLMAR, OF SAN FRANCISCO, CALIFORNIA, ASSIGNORS TO COLMAR BURNER COMPANY, OF SAN FRANCISCO, CALIFORNIA, A CORPORATION OF CALIFORNIA.

HYDROCARBON GENERATOR AND BURNER.

Application filed October 19, 1920. Serial No. 418,033.

*To all whom it may concern:*

Be it known that we, GEORGE N. BLANCHARD and CLARENCE F. COLMAR, citizens of the United States, residing at the city and county of San Francisco and State of California, have invented certain new and useful Improvements in Hydrocarbon Generators and Burners, of which the following is a specification.

The present invention relates to improvements in burner constructions for utilizing as a fuel medium gas generated from hydrocarbon liquid fuels, and has for its principal object to provide an organized apparatus wherein there is provided associated devices for generating hydrocarbon fuel into a gas for supplying to the burner, having means whereby the temperature of the generator controls the supply of fuel therethrough, one wherein the initial heating of the generator to the required gasifying temperature automatically admits fuel into and through the generator for gasifying, one wherein the means for initially heating the generator to the required temperature also provides a means for igniting the gas generated within the generator and supplied to and issuing from the burner openings to the burner.

A further object is to provide a means for initially heating the generator by gas generated from fuel of the type supplied to the generator, and from the same general feed connection; and to provide means associated with the element for initially heating the generator whereby its flow of fuel is automatically shut off at a predetermined time.

A further object is to provide a generator construction equipped with a member at the discharge end for controlling the discharge of the generated gas into the burner mixing chamber, and one provided with a member whereby the discharge tip of the generator will be maintained free of carbon at all times.

In accomplishing these results, and in providing what may be termed an automatically controlled generating and burning unit for gaseous fuel generated from liquid hydrocarbon oils, the hereinafter described elements are associated and connected in such manner as to provide an apparatus capable of accomplishing the aforementioned results.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein:—

Figure 1 is a view in top plan of the preferred embodiment of our invention.

Figure 2 is a view in side elevation of the construction illustrated in Figure 1.

Figure 3 is a view in side elevation of the construction illustrated in Figure 1 viewed from the side opposite to which Figure 2 is taken.

Figure 4 is a transverse sectional view taken on the line 4—4 of Figure 1 illustrating the burner casting and the mixing chamber, and Figure 5 is a sectional view taken on line 5—5 of Figure 1 disclosing the controlling valve and cleaning needle at the discharge tip end of the generator.

Figure 6:
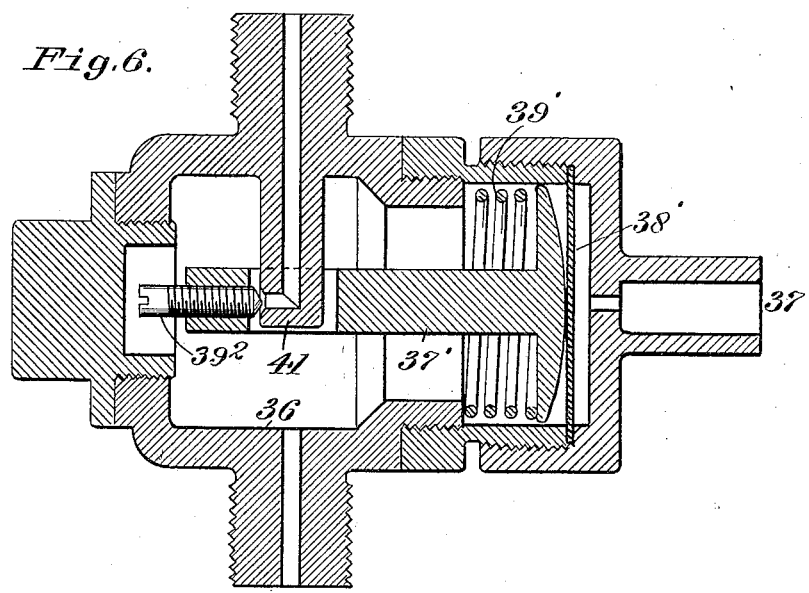
Figure 6 is a vertical sectional view in detail of the valve for controlling the supply of fluid to the generator.
Figure 7:
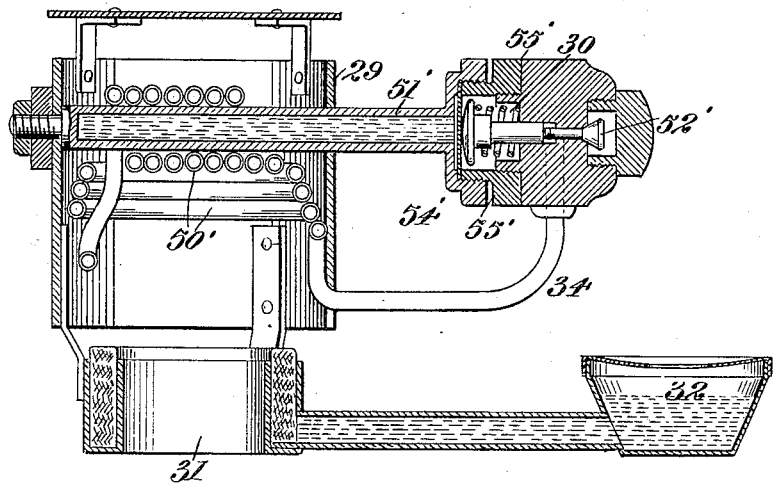
Figure 7 is a vertical sectional view through the generator heater.

In the drawings, wherein like characters of reference designate corresponding parts, 1 indicates a burner substantially rectangular in plan and formed in a single cast. The burner is provided with a central portion 2 having suitable pilot burner slots 3 extending longitudinally of one end thereof, and terminating at a point beneath the raised portion 4 of the burner, which provides a mixing chamber 5 into which discharges the gas generated by the hereinafter described mechanism.

At either side of the central portion 2 are provided the parallel tubular burner channels 6 communicating with each other at their opposite ends, and with the main portion 2, by lateral channels 7, the said burner channels being separated intermediate their opposite ends between the walls of said lateral channel 7 by passages 8 which admit of the circulation of air between adjacent channel forming walls. The upper surfaces of the channels are preferably flat and are preferably disposed in the same plane, and are provided with the laterally disposed parallel spaced burner slots 9, Figures 1 and 4 of the drawings. This burner construction enables a uniform distribution of the generated gases over a wide area of the passages 8 between adjacent burner channels and enables the burners to be maintained relatively cooled for the proper burning of the generated gases. In the front vertical wall of the portion 4, there is provided a suitable opening 10 which is in line with a corresponding opening formed in an upstanding integral portion 11 at the opposite end of the burner 1.

Liquid hydrocarbon fuel of any suitable gravity is generated into a gas by the pilot flame issuing from the slots 3, as it is supplied to a suitable generator, one embodiment of which is set forth in Letters Patent of the United States, #1,372,280, dated March 22nd, 1921, and said generator consists of a tubular outer shell or casing 12 disposed with its discharge end projecting through the opening 10, and with its opposite end extended through and held by a set screw 13 within the opening in the member 11. The preferred embodiment of the generator may be briefly described as follows:—

At the discharge end thereof is positioned a tubular closure member 14 having a reduced discharge end into which is threaded a discharge tip 15 provided with a discharge orifice 16 through which the gas generator within the tube 12 discharges under pressure into the mixing chamber 5. From the inner end of the member 14 extends a cylindrical sleeve 17, the outer wall of which is spaced from the inner wall of the tube 12 providing a gas passage around the same, and the gas received in said passage passes into the interior of the chamber in the member 14 through one or more ports 18. Extending longitudinally within the tube 12 and threaded at its outer end into the end of the sleeve 17 is a gas control valve 19, the tapered end of which is adapted when the valve is rotated to closed position, to seat on the bevel wall 20 on the interior of the member 14. The member 19 is tubular in form, and extends at its outer end exteriorly of the free end of the tube 12, and is provided with an operating handle 21 to facilitate the opening and closing of the gas channel. To maintain the generator tip free from carbon deposit, a tip cleaning rod 22 is mounted within the tubular portion of the member 19, and is of a length to project beyond the ends thereof. The inner end of the member 22 is reduced to form a cleaning needle 23, and the outer end is provided with a head 24 to facilitate the inward pressing of the member 22 to project the needle end thereof into the orifice 16 to free the same of carbon. A coiled spring 25 normally maintains the needle end 23 removed from the discharge orifice 16, as in Figure 5 of the drawings.

From this construction, it will be apparent that the discharge of the gas from within the generator is controlled at a point within the generator adjacent to where the generator enters the mixing chamber 5.

Hydrocarbon liquid fuel of any suitable gravity is supplied under pressure into the generator tube 12 through a valve controlled connection 26, the valve 27 therein regulating the maximum flow of fuel to be admitted.

In devices of the present type, it is necessary to initially heat the generator 12 to raise the temperature thereof to a point sufficiently high to generate the initial fuel volume supplied thereto into gas, and in accomplishing this result we prefer to employ a perforated tube 28 disposed longitudinally of the generator tube 12, and at the outer end of the same is mounted a suitable auxiliary gas generator 29 supplied with fuel from the connection 26 through a thermostatic valve casing 30 of any suitable construction, which is operated by the temperature within the generating chamber. This temperature is caused by an auxiliary pilot burner 31 preferably supplied with suitable fuel through a feed 32. A pipe 33 supplies the fuel connection from 26 to the valve 30, and a pipe 34 conducts the fuel from the valve casing 30 into the auxiliary generator 29.

The pipe 34 is coiled as at 50' above the burner 31 about a mercury containing tube 51', which mounts the valve casing 30. Within the casing 30 is located a valve 52' controlling the passage of fuel from pipes 33 to 34. The valve is mounted on a plunger 53' normally maintained in contact with the diaphragm 54' by a spring 55'. The diaphragm 54' is operated by the expansion of the mercury within tube 51' on the tube being sufficiently heated by burner 31, and by the spring 55' on the flame of burner 31 lowering or being extinguished. Briefly this device operates in the following manner, the fuel within the auxiliary pilot burner 31 being ignited in any suitable manner, the heat from said burner raises the temperature of the auxiliary generator 29, and on the temperature thereof rising to a given point, said temperature opens the valve casing 30 permitting the flow of fuel to be generated into gas in the auxiliary generator 29, and as generated into gas, the fuel passes therethrough into perforated tube 28. Above the tube 28 adjacent the auxiliary generator 29, is a conducting tube 35, which causes an igniting of the gas issuing from the perforations in tube 28 by the flame of the burner 31 within the generator 29, thus on the generation into gas of the fuel admitted into the mixing chamber 5, and the discharge of the same through the perforations in tube 28, the flame of the burner 31 automatically ignites said auxiliary generator, and the flame therefrom heats the main generator until the fuel therein is generated into gas, and passes into the mixing chamber 5, and therefrom into the pilot burner slots 3 and main burner slots 9, after which time the flame beneath the generator 12 maintains the same at the required generating temperature. On the fuel charge within the auxiliary burner 31 extinguishing by burning out, the temperature of the auxiliary generator 29 automatically lowers and the valve within casing 30 automatically closes shutting off the supply of fuel to the auxiliary generator 29.

It will thus be apparent that after the lighting of the auxiliary burner 31, the operation of admitting fuel into the auxiliary generator converting the same into gas igniting the gas and directing against the main generator, and the shutting off of the fuel supply to the auxiliary generator, is all automatic.

To preclude the continued feeding of fuel to the main generator, should for any reason the flame of the burner 1, or the pilot burner 3, become extinguished, or should for any reason the temperature of the generating tube 12 fall below the generating temperature, the flow of fuel to the generating tube is automatically cut off to prevent the flooding of the generator tube and consequent flooding of the burner, which might cause serious damage should the same be subsequently ignited and contain highly volatile hydrocarbon fuel oil.

The mechanism for accomplishing this purpose consists primarily in a valve casing 36 interposed in the fuel feed pipe 26 between the manually controlled valve 27 of the generator tube 12, and said valve casing mounts a plunger 37' separated from the mercury in tube 37 by a diaphragm 38'. A spring 39' tends to normally seat the plunger 37' and the plunger mounts an adjustable needle valve $39^2$, which is adapted to control the fuel inlet passage 41' within the casing 36. Said valve is of the pressure controlled type, and connected with the same is a suitable operating member in the form of a mercury tube which is disposed in proximity to the generator tube 12, and is illustrated as being coiled at one end about the same as at 38, although it is to be understood that this tube may be constructed in any suitable manner just so long as the same is in proximity to the generator and is heated by the heat radiating therefrom. The mercury in tube 37 tends when expanded to unseat the valve in casing 36 and when contracted to permit the closing thereof to shut off the fuel flow to the generator.

From this construction, it will be apparent that, as long as the generator tube is of a sufficient temperature to generate the heated carbon fuel delivered thereinto into gas, the mercury in the tube 37 is expanded sufficiently to maintain the valve in the casing 36 unseated, but if for any reason should the temperature of the generator tube fall below generating temperature, the mercury in the tube 37 will contract and enable the valve in the casing 36 to become seated, and thereby automatically cut off the flow of fuel into the generator tube 12.

It will be apparent that in our present invention, we have provided a construction wherein the operating and controlling elements are connected in such manner as to render the burner substantially fool proof, flood proof, and automatically ignitible on the heating of the generator tube to a temperature sufficient to generate from the fuel feed thereinto gas for burning purposes.

We claim:—

1. A gaseous fuel burner construction consisting of a burner casting, having a hollow interior and substantially rectangular in plan, said casting provided on each side of its longitudinal center with a plurality of parallel burner channels, the upper surface of said burner channels being substantially flat and disposed in substantially the same plane and provided with a plurality of parallel spaced longitudinally extending burner slots, a mixing dome discharging into the hollow interior of said member, a generator overlying the burner casting and discharging into said mixing dome, and a valve controlled means for supplying fuel to said generator.

2. A gaseous fuel burner construction consisting of a burner member, formed in a single casting having a hollow interior and substantially rectangular in plan, said casting provided on each side of its longitudinal center with a plurality of parallel burner channels separated intermediate their ends by an air passage affording a cooling chamber, the upper surface of said burner channels being substantially flat and disposed in the same plane and provided with a plurality of parallel spaced longitudinally extending burner slots, a mixing dome formed integral with the casting and disposed centrally thereof, a generator and tube overlying the burner casting and discharging into said mixing dome, and valve controlled means for supplying liquid fuel to said generator.

In testimony whereof we have signed our names to this specification.

GEORGE N. BLANCHARD.
CLARENCE F. COLMAR.